United States Patent [19]

Stölzer

[11] Patent Number: 5,062,267
[45] Date of Patent: Nov. 5, 1991

[54] HYDROSTATIC TRANSMISSION CONTAINING AN AXIAL PISTON MOTOR LOCATED IN A RECESS OF A VALVE CONTROLLED AXIAL PISTON PUMP

[75] Inventor: Rainer Stölzer, Ulm, Fed. Rep. of Germany

[73] Assignee: Hydromatik GmbH, Elchingen, Fed. Rep. of Germany

[21] Appl. No.: 446,940

[22] Filed: Dec. 6, 1989

[30] Foreign Application Priority Data

Dec. 8, 1988 [DE] Fed. Rep. of Germany ....... 3841382

[51] Int. Cl.[5] ............................................. F16D 39/00
[52] U.S. Cl. ..................................................... 60/493
[58] Field of Search ................... 60/325, 493; 91/499, 91/507

[56] References Cited

U.S. PATENT DOCUMENTS

| | | | |
|---|---|---|---|
| 2,722,889 | 11/1955 | Wahlmark | 91/499 |
| 3,364,679 | 1/1968 | Osojnak | 60/329 |
| 3,464,206 | 9/1969 | Badalini | 60/456 |
| 3,498,227 | 3/1970 | Kita | 91/499 |
| 4,939,900 | 7/1990 | Furumoto et al. | 60/456 |

FOREIGN PATENT DOCUMENTS

| | | | |
|---|---|---|---|
| 1500457 | 7/1969 | Fed. Rep. of Germany . | |
| 1124282 | 6/1956 | France | 91/507 |
| 980837 | 1/1965 | United Kingdom . | |
| 1314055 | 8/1970 | United Kingdom | 91/499 |

Primary Examiner—Edward K. Look
Assistant Examiner—F. Daniel Lopez
Attorney, Agent, or Firm—Scully, Scott, Murphy & Presser

[57] ABSTRACT

To make possible a small, compact construction of a hydrostatic transmission comprising a housing containing a valve-controlled piston pump, in particular an axial piston pump, which includes a first drive part rotatably driven by a drive shaft and a stationary cylinder block with pistons, and comprising a piston motor, in particular an axial piston motor, connected to the pump by at least one hydraulic line, the motor comprises a non-rotatable second drive part and a rotatable cylinder drum and is integrated in the housing of the pump on the side opposite to the first drive part, and the cylinder drum is fixed non-rotatably on an output shaft and is arranged at least partly in a recess in the cylinder block of the pump.

22 Claims, 3 Drawing Sheets es,062,267

HYDROSTATIC TRANSMISSION CONTAINING AN AXIAL PISTON MOTOR LOCATED IN A RECESS OF A VALVE CONTROLLED AXIAL PISTON PUMP

TECHNICAL FIELD OF THE INVENTION

The invention relates to a hydrostatic transmission according to the preamble of claim 1.

BACKGROUND OF THE INVENTION AND PRIOR ART

A hydrostatic transmission of this type is known and used in many technical fields. When using axial piston machines the axial piston motor is usually arranged remote from the axial piston pump and is connected to the axial piston pump by lines in an open or closed circuit. In this way a simple driving connection can be made independently of where the axial piston pump and the axial piston motor are installed and, depending on the type of pump and motor, a transmission having a predeterminable transmission ratio can be provided at the same time.

There are however also types of application in which a separate arrangement of the pump and motor is not desired or possible, e.g. in particular for continuously variable transmissions in small vehicles, such as lawn mowers, local transport vehicles and the like. Long connections are likewise not desirable for adapting the speed of auxiliary units to internal combustion engines. The same applies in particular to distributing the speed of electric motors which have to be arranged with the units to be driven by them in a restricted space.

OBJECT OF THE INVENTION

It is an object of the invention to design a hydrostatic transmission of the kind described in the introduction so that a small compact construction is possible.

SUMMARY OF THE INVENTION

This object is achieved by means of the characterising features of claim 1.

According to the invention the pump and the motor are arranged in a housing and the desired compact construction is achieved by accommodating the rotatable cylinder drum of the motor at least partly in a recess in the cylinder block of the pump. The arrangement according to the invention is also suitable for other kinds of piston machines such as radial piston machines.

It is true that DE-OS 15 00 457 discloses an axial piston transmission in which, to achieve a compact and space saving construction, a rotatable cylinder drum of the motor is integrated in the pump housing, the motor furthermore having a non-rotatable second drive part and the cylinder drum of the motor being fixed non-rotatably on a drive shaft and being arranged at least partly in a recess in the cylinder block of the pump. Since, however, in this known transmission the cylinder block of the pump is not securely connected to the housing but is non-rotatably connected to the drive shaft and the first drive part is made so that it can pivot but is otherwise securely attached to the housing, this known transmission does not have sufficiently compact dimensions in the radial and axial directions. Furthermore this known transmission is volume-controlled, so that the setting mechanism necessary for adjusting the volume involves a more complicated construction, which is detrimental to the compact construction.

Further volume controlled hydrostatic transmissions having the same disadvantages are, for example, known from FR 1 180 164, DE-AS 1 425 806 and GB 980 837.

The subclaims describe advantageous further developments of the invention which likewise contribute to achieving the object and which in addition are characterised by a construction that is simple, convenient to assemble and/or economical to manufacture, and by advantageous sealing means and simple control means, with reliable operation and long service life.

BRIEF DESCRIPTION OF THE DRAWINGS

The invention will now be described in more detail with reference to a preferred exemplary embodiment shown in the simplified drawings, in which.

DETAILED DESCRIPTION OF PREFERRED EXEMPLARY EMBODIMENTS OF THE INVENTION

Figure 1:
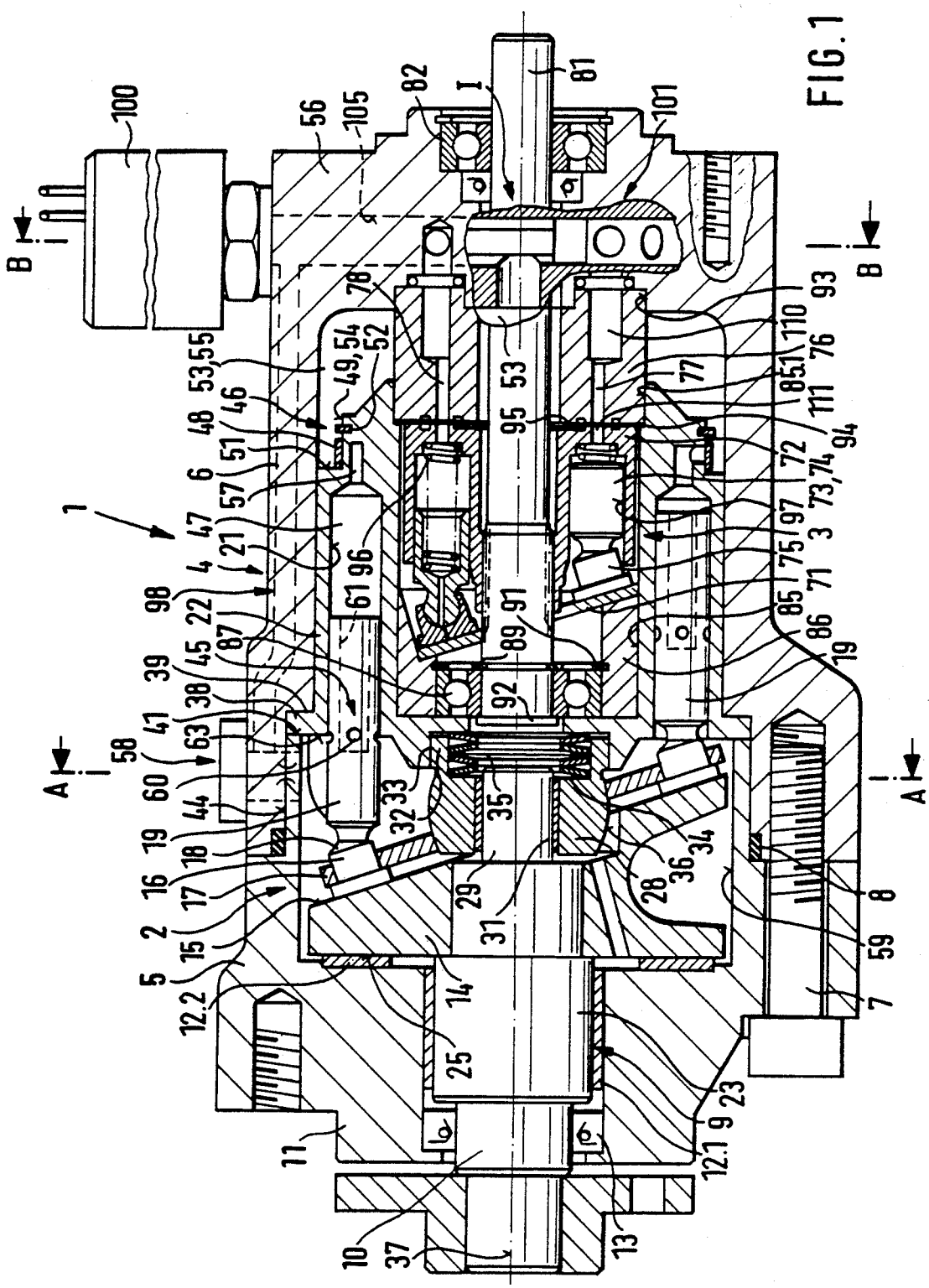
FIG. 1 shows a hydrostatic transmission designed according to the invention, in an axial longitudinal section.

In the hydrostatic transmission generally indicated by 1, an axial piston pump 2 and an axial piston motor 3 are integrated in a common housing 4 comprising two cup-shaped housing parts 5, 6 which are placed with their open rims together, screwed together by means of screws 7 and sealed by means of a seal 8. One screw 7 is shown in FIG. 1.

The essential parts of the pump 2 are a drive shaft 9 mounted axially in the housing 4, with its outer part 10 passing through the end wall 11 of the housing part 5 and being mounted therein by means of a plain bearing, indicated generally by 12, next to a seal 13; a swash plate 14 fixed non-rotatably on the drive shaft 9; and axial pistons 19 that bear on the swash plate 14 in known manner through slippers 16 and a retaining plate 17 through which the slippers pass. The pistons are arranged in a circle and are mounted axially displaceably in a cylinder block 22 fixed in the housing 4, with their spherical heads 18 mounted in spherical bearings in the respective slippers.

The bearing 12 includes a radial bearing 12.1 for a section 23 of the shaft extending between the seal 13 and the swash plate 14, and an axial bearing 12.2 comprising a radial inner shoulder surface on the housing part 5 and the radial surface 25 of the swash plate 14 remote from the oblique surface 15. Antifriction layers of a bearing metal are arranged between the radial and axial bearing surfaces and are preferably attached to the housing part 15.

In the present exemplary embodiment the inner end of the drive shaft 9 is mounted radially in the cylinder block 22 by means of a spherical bearing part 28. The bearing journal 29 of the drive shaft 9 is mounted in a bearing, in particular a plain bearing 31, provided in the bearing part 28, with a cylindrical bearing foot 32 of the bearing part 28 remote from the swash plate 14 being inserted sealingly in a suitably shaped front end recess 33 in the cylinder block 22. Arranged on the same side in an internal recess 34 in the bearing part 28 is at least one washer, preferably a spring washer assembly 35, by means of which the bearing part 28 carrying the retaining plate 17 pivotably mounted on its spherical bearing surface 36 and the slippers 16 are urged against the oblique surface 15. The bearing journal 29 is preferably arranged so that a plane going through the heads 18 of the pistons 19 intersects the longitudinal middle axis 37 of the hydrostatic transmission 1 at a point in the region of the bearing journal 29.

The cylinder block 22 is held in an axially immovable manner by means of a flange 38 between an inner shoulder surface 39 on the housing part 6 and a shoulder surface 41 on the free end of the housing part 5, with the free end of the housing part 6 overlapping the free end of the housing part 5 in an external annular recess 44 in which the seal 8 is arranged.

The pump 2 is valve-controlled and thus independent of the direction of rotation. For this purpose inlet valves and outlet valves, indicated generally by 45 and 46, are provided for the cylinders 47, the outlet valves 46 having a common closing member in the form of a flat ring 48 of elastically flexible but not extensible material. The flat ring 48 is fitted with a certain amount of radial and lateral play on to a cylindrical outer surface on the end of the cylinder block 22 remote from the swash plate 14 between a shoulder surface 51 of the rebate formed there and a retaining ring 52 inserted in the cylindrical outer surface 49. The outlet valves 46 feed into a common pressure chamber 53 which is formed between the cylinder block 22 and the end wall 56 of the housing part 6 by the above-mentioned radial rebate 54 and a space 55 for pulsation damping. Opening into the outer cylindrical surface 49 are the outlet passages 57 which extend from the cylinders 47 and have first axial and then radial passage sections.

Provided near or in the region of the joint between the housing parts 5, 6, in the present case in the overlapping region, is a suction connection 58, in this case on the housing part 6, which opens into the housing chamber 59 of the pump 2. Each inlet valve is formed by a passage connection, comprising a radial hole 60 and an axial passage, extending from the respective working chamber within each piston 19 and issuing radially at a specific point on the piston skirt. The arrangement is such that the hole 62 is open to the housing chamber 59 when the associated piston 19 is in its retracted position, but in the advanced position of the associated piston 19 it is covered by the wall or edge 63 of the associated piston bore 21. The distance of the hole 62 in its retracted position from the rim or from the edge 62 of the associated piston bore 21 must be adapted to the operating requirements so that in the associated cylinder 47 the hydraulic medium, preferably oil, can be sucked from the housing chamber 59 and compressed in the cylinder 47 in a manner known per se. Filling of the associated cylinder 47 from the housing chamber 59 occurs when the piston 19 is in this retracted position. Four radial holes 62 distributed on the periphery are preferably provided. The passage 61 leading out from the front end of the piston 19 may comprise a hollow piston.

Up to this point the embodiment described above corresponds to an embodiment described and illustrated in an earlier DE-OS 37 24 967 of the applicant. Reference is made to this embodiment or patent application in its entirety.

The essential parts of the motor 3 are a second swash plate 71, a rotatable cylinder drum 72 having piston bores 73, arranged on a pitch circle, in which the pistons 74 are axially displaceably accommodated and bear against the swash plate 71 by way of spherical piston heads and slippers 75 mounted thereon, and a plate-shaped control part 76 having kidney-shaped control slots known per se (not shown), and axial inlet and outlet passages 77, 78 issuing therefrom, of which the outlet passage 78 extends outwardly through the end wall 56 of the housing part 6 to a pressure line connection.

The essential parts also include an output shaft 81, on which the cylinder drum 72 is fixed non-rotatably, and which passes through apertures in the control part 76 and the end wall 56 towards the associated end of the housing 4, and at its outer end is mounted in a bearing 82 on the end wall 56 of the housing part 6.

The cylinder block 22 is hollow or cup-shaped due to a central recess 85 open to the end remote from the first swash plate 14. At least partly accommodated in this recess 85 are the essential parts of the motor 3. More particularly, the second swash plate 71 is arranged on the side of the cylinder drum 72 facing the first swash plate 14 and supported in a fixed oblique position on a supporting part 86 which is arranged at the base of the recess 85 and carries on the inside a rolling bearing 87 for the inner end 88 of the output shaft 81. The rolling bearing 87 is secured axially on the output shaft 81 and in the supporting part 86 or in the cylinder block 22 by two retaining rings 89, 91 and a shoulder 92 on the inner end of the drive shaft 81. In the present exemplary embodiment the cylinder drum 72 is thus arranged on the side of the second swash plate 71 remote from the pump 2 and is thus also in the recess 85.

The control part 76 is fixed non-rotatably on the facing side of the end wall 56 of the housing part 6. The control part 76, which is preferably circular in cross-section, is inserted sealingly in a correspondingly dimensioned recess in the end wall 56 whereby the control part 76 is also centred radially. It is advantageous to support the control part 76 on its other side axially on the cylinder block 22 so that it does not need a special fastening element to fasten it to the end wall 56. In the present exemplary embodiment the control part 76 is supported not only axially but also radially on the cylinder block 22, with part of its length being inserted, likewise sealingly, into a recess section 85.1 of wider cross-section, and bears axially on the shoulder 94 formed by the widening. Sealing of the inlet and outlet passages 77, 78 is by means of ring seals which are arranged in special recesses in the floor of the recess 93.

The cylinder drum 72 bears against the control surface 95 of the control part 76, this being ensured on the one hand by the working pressure and on the other hand by compression springs 96 which are inserted between the pistons 74 and the base of the cylinder 97 and engage in the pistons 74, which are hollow pistons. The pistons 74 with the slippers 75 are also urged against the swash plate 71 by the same forces.

Figure 3:
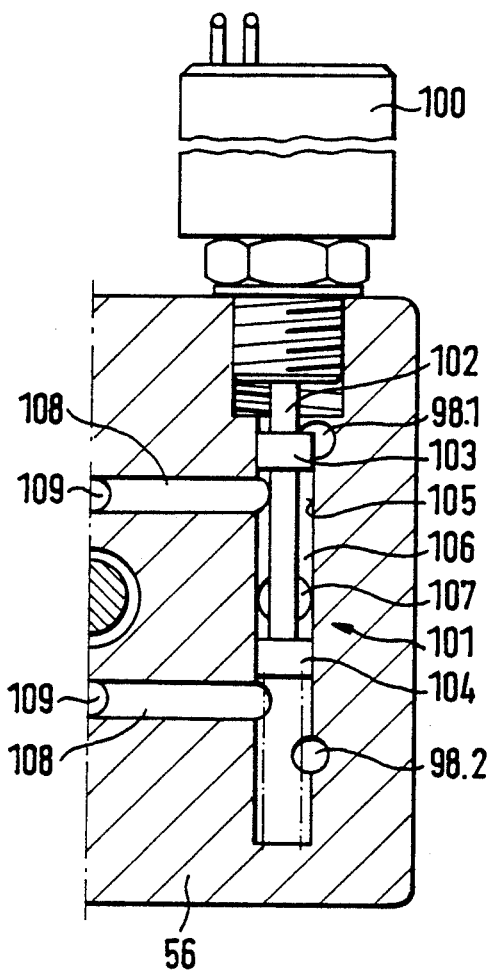
FIG. 3 is a section on the line B—B in FIG. 1.
Figure 2:
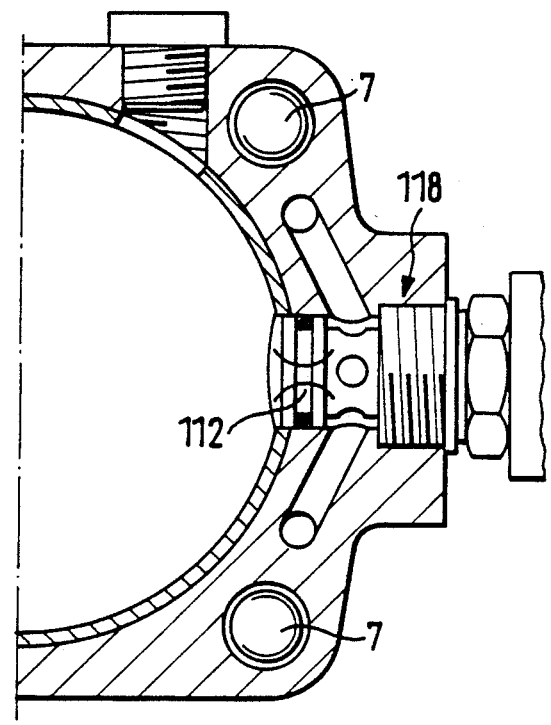
FIG. 2 is a section on the line A—A in FIG. 1.

In the exemplary embodiment shown in FIGS. 1 to 3 the hydrostatic transmission 1 is set up for operation in a closed circuit with the hydraulic fluid issuing from the motor 3 being fed back to the pump 2 through the return line 98 leading into the inlet line.

In the present exemplary embodiment a change-over or shuttle valve, indicated generally by 101, is provided with which the passages 77, 78 of the motor 3 can be connected, as desired, to the pressure chamber 53 or to the return line 98 indicated in FIG. 1 or to a tank. By this means the direction of rotation of the motor 3 can be determined as desired. The change-over valve 101 has a control rod 102 that is driven by an electromagnet 100 and, in the present exemplary embodiment, is mounted so that it is longitudinally displaceable in the end wall 56 transverse to the longitudinal middle axis 37, and which has two control sections or control pistons 103, 104 spaced apart, each being bounded by two control edges, of which—as shown in FIG. 3—in one end position of the control rod 102 the control piston 103 frees the passage from the pressure chamber 53 to the motor 3 and blocks the passage from the motor 3 to the return passage 98, while the other control piston 104 blocks the passage from the pressure chamber 53 to the motor 3 and opens the passage from the motor 3 to the return passage 98. In the other (lower) end position (not shown in FIG. 3) of the control rod 102 the passage from the pressure chamber 53 to the motor 3 is blocked by the control piston 103 and the passage from the motor 3 to the return passage 98 is opened, while the passage from the pressure chamber 53 to the motor 3 is opened by the control piston 104 and the passage from the motor 3 to the return passage 98 is blocked.

In the present exemplary embodiment two return passage branches 98.1, 98.2 running spaced from one another are provided which are connected by means of cross passages 99.1, 99.2 to the suction connection or inlet indicated generally by 58.

The operation of the exemplary embodiment shown in FIGS. 1 to 3 will now be described. It should be noted that the partial section I shown in FIG. 1 is lower than the plane of the drawing, i.e. it intersects the control rod 102 that is arranged off-centre. Because of this, a pressure passage 107 extending between the pressure chamber 53 and the guide bore 105 of the control rod 102 and leading into the annular space 106 between the control pistons 103, 104 is shown in the partial section I in FIG. 1. In the position of the control rod 102 shown in FIG. 3 the pressure fluid reaches the respective cylinder via the pressure passage 107, the annular passage 106, a passage section 108 extending transversely, the passage section 109 extending longitudinally in the end wall 56, the passage section 110 extending longitudinally in the control part 76 and, after passing the control edges, (not shown) via the passage section extending in the floor of the cylinder 97 on the pressure side whereby, owing to the inclination of the swash plate 71 and the piston forces, the cylinder drum 72 is rotated. The hydraulic fluid discharged by the cylinders 97 on the low pressure side reaches the suction or housing chamber 59 via corresponding passage sections through the unobstructed guide bore 105 and the return passage 98.2. In the other end position of the control rod 102, namely in the (lower) position indicated in FIG. 3, the other operating side of the motor 3 is loaded with pressure fluid while the hydraulic fluid discharged from the motor 3 through the passage sections 108 to 111 is supplied to the return passage 98.1.

In the present exemplary embodiment an adjustable throttle 112, indicated in FIG. 3, is arranged in the inlet line in the direction of flow behind the opening of the return passages 98, 98.1, 98.2, by means of which the driving speed can be controlled by throttling the suction flow.

Figure 4:
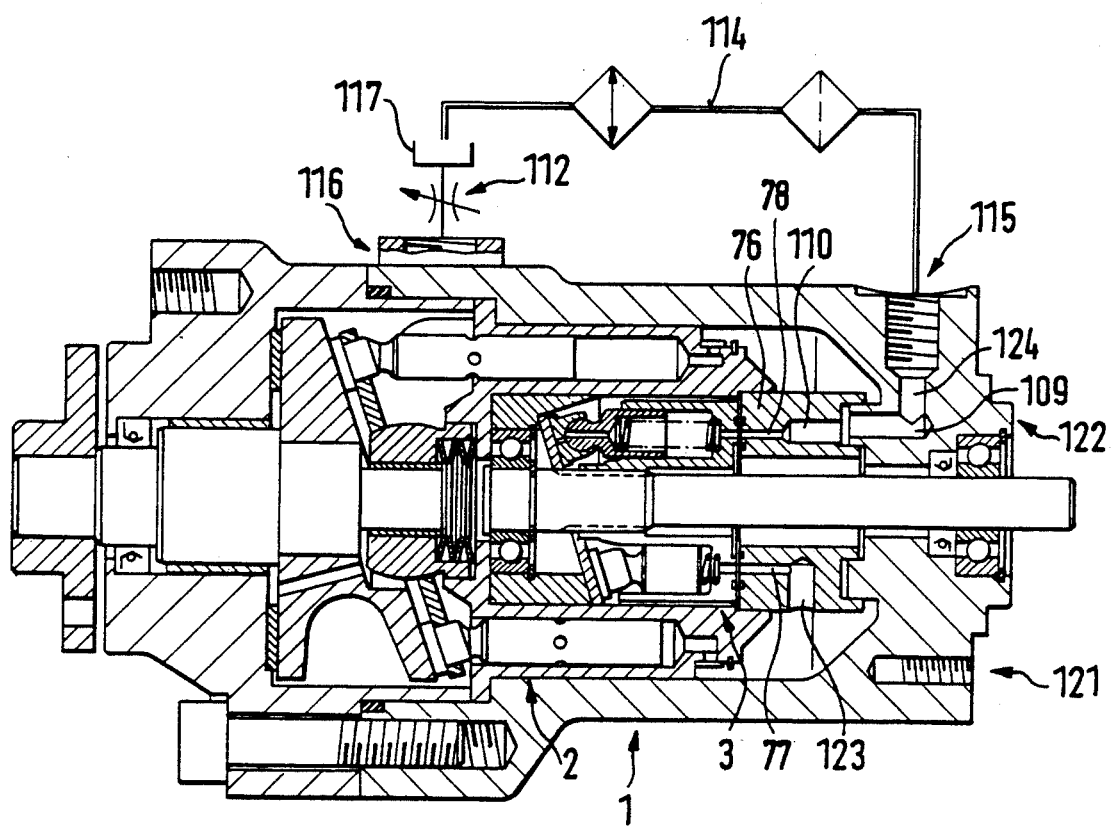
FIG. 4 shows a second exemplary embodiment of a hydrostatic transmission designed according to the invention, in an axial longitudinal section.

The exemplary embodiment shown in FIG. 4 differs from the exemplary embodiment described above in that on the one hand there is no change-over valve 101 and the hydrostatic transmission 1 is arranged to function in an open circuit and the return flow does not take place through passages in the wall of the housing 4 but through an external line 114 which extends from an outlet connection 115 to the inlet connection 116 via an open tank 117. In this exemplary embodiment the adjustable throttle 112 can be arranged in the inlet line between the tank 117 and the inlet connection 116 or, as in the exemplary embodiment described above and shown in FIG. 2, can be formed by a screw-down valve 118.

Because the change-over valve 101 is dispensed with the passage sections leading to and from the motor 3 can be simplified. In the present exemplary embodiment the pressure side 121 of the motor 3 comprises a radial feed passage section 123 leading into the control part 76, from which the passage section 110 issues. On the low pressure side a radial passage section 124 leads from the discharge passage section 109 to the outlet connection 115.

What is claimed is:

1. A hydrostatic transmission comprising a housing containing a valve-controlled piston pump, in particular an axial piston pump, which includes a first drive part rotatably driven by a drive shaft, and a stationary cylinder block with pistons, and comprising a piston motor, in particular an axial piston motor, that is connected to said pump by at least one hydraulic line, wherein said motor comprises a non-rotatable second drive part and a rotatable cylinder drum and is integrated in the pump housing on a side opposite to said first drive part, the cylinder drum being fixed non-rotatably on an output shaft and being arranged at least partly on an output shaft and being arranged at least partly in a recess in the cylinder block of said pump, said output shaft having an inner and outer end, said inner end being mounted in said cylinder block.

2. A hydrostatic transmission according to claim 1, wherein the motor is an axial piston motor having a swash plate with a fixed angle of inclination.

3. A hydrostatic transmission according to claim 2 wherein the swash plate of the motor is inserted in a base of said recess in the cylinder block of the pump and a control part of the motor is arranged on the end wall of the housing on the output side.

4. A hydrostatic transmission according to claim 3, wherein said swash plate is a substantially parallel plate which is inserted in a seat formed on a support part inserted in the base of said recess.

5. A hydrostatic transmission according to claim 3, wherein said control part is bounded axially between an output side end wall of the housing and a shoulder surface of said cylinder block.

6. A hydrostatic transmission according to claim 5, wherein said control part engages over at least one section of its width into said recess in said cylinder block.

7. A hydrostatic transmission according to claim 3, wherein said control part is supported radially on an inner peripheral surface of said cylinder block.

8. A hydrostatic transmission according to claim 1, wherein said housing comprises two adjoining, mutually centred cup-shaped housing parts.

9. A hydrostatic transmission according to claim 8, wherein said cylinder block has a flange with which it is held axially between said two housing parts.

10. A hydrostatic transmission according to claim 1, wherein the supply and discharge lines of the motor are each selectively connectable by actuation of a change-over valve with the pressure chamber of the pump, a return line leading to said pump and to a tank.

11. A hydrostatic transmission according to claim 10, wherein the change-over valve has a piston slide having two control pistons therein which are displaceable in a guide bore extending within the output side end wall of the housing transverse to and spaced from the longitudinal central axis of the housing and being connectable, in the region between the control pistons, with the pressure chamber through a passage and a return line on either side of said passage.

12. A hydrostatic transmission according to claim 11, wherein an adjustable throttle is arranged in the return line connecting the motor to the pump.

13. A hydrostatic transmission according to claim 11, wherein an adjustable throttle is arranged in a pump supply line.

14. A hydrostatic transmission according to claim 13 or 12, wherein said adjustable throttle is part of a screw-down valve.

15. A hydrostatic transmission according to claim 12, or 13, wherein said adjustable throttle is part of a screw-down cartridge.

16. A hydrostatic transmission according to claim 1, wherein at least one inlet valve comprises a passage extending in an associated piston initially axially from a front face thereof and then radially, so as to open outside a wall of a piston bore in a retracted position of the piston.

17. A hydrostatic transmission according to claim 1, wherein at least one outlet valve comprises a passage extending from an associated cylinder and issuing radially at a cylindrical surface thereof and a non-extensible but elastically flexible flat valve ring arranged with radial clearance within said cylindrical surface.

18. A hydrostatic transmission according to claim 1, wherein at least one outlet valve comprises a passage extending from an associated cylinder and issuing radially at a cylindrical surface thereof and a non-extensible but elastically flexible flat valve ring arranged with radial clearance outside of said cylindrical surface.

19. A hydrostatic transmission according to claim 17 or 18, wherein said cylindrical surface is a stepped outer surface spaced radially from an inner wall of the housing and the valve ring is held with lateral play for movement and passage between the stepped surface and a securing element inserted in said cylindrical outer surface.

20. A hydrostatic transmission comprising a housing containing an axial piston pump, which includes a first drive part rotatably driven by a drive shaft, and a stationary cylinder block with pistons, and comprising an axial piston motor, connected to said pump by at least one hydraulic line, wherein said motor comprises a non-rotatable second drive part and a rotatable cylinder drum and is integrated in the pump housing on a side opposite to said first drive part, the cylinder drum being fixed non-rotatably on an output shaft and being arranged at least partly on an output shaft and being arranged at least partly in a recess in the cylinder block of said pump said transmission also including a pressure chamber of said pump defined by an output side end wall of the housing and said cylinder block.

21. A hydrostatic transmission according to claim 20, wherein a supply line to the motor comprises a radial passage section extending from said pressure chamber and a passage section extending axially in the control part of the motor to at least one control slit, and a discharge line extends axially through a control part into an output side end wall and thence to a return line.

22. A hydrostatic transmission according to claim 21, wherein said return line comprises at least one return passage extending in a wall of the housing.

* * * * *